(12) United States Patent
Levitan et al.

(10) Patent No.: US 9,916,344 B2
(45) Date of Patent: Mar. 13, 2018

(54) COMPUTATION OF COMPOSITE FUNCTIONS IN A MAP-REDUCE FRAMEWORK

(71) Applicant: International Business Machines Corporation, Armonk, NY (US)

(72) Inventors: Svetlana Levitan, Skokie, IL (US); Damir Spisic, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/986,810

(22) Filed: Jan. 4, 2016

(65) Prior Publication Data

US 2017/0193030 A1 Jul. 6, 2017

(51) Int. Cl.
*G06F 17/30* (2006.01)

(52) U.S. Cl.
CPC .. *G06F 17/30371* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 7,523,123 B2* | 4/2009 | Yang | G06F 17/30498 |
| 8,321,454 B2 | 11/2012 | Berlyant et al. | |
| 8,612,368 B2 | 12/2013 | Burdick et al. | |
| 8,959,138 B2 | 2/2015 | Narang et al. | |
| 9,535,902 B1 | 1/2017 | Michalak et al. | |
| 2013/0086356 A1* | 4/2013 | Narang | G06F 9/5066 712/30 |
| 2014/0101092 A1 | 4/2014 | Simitsis et al. | |
| 2015/0127880 A1 | 5/2015 | Felch | |
| 2015/0150018 A1 | 5/2015 | Hu et al. | |
| 2017/0083384 A1 | 3/2017 | Stocker et al. | |
| 2017/0116289 A1 | 4/2017 | Deshmukh et al. | |

OTHER PUBLICATIONS

Chen et al., "Parallel Evaluation of Composite Aggregrate Queries", ICDE 2008, pp. 218-227, IEEE.
Fegaras et al., "An Optimization Framework for Map-Reduce Queries", EDBT 2012, Mar. 26-30, 2012, pp. 26-37.
Gu et al., "SHadoop: Improving MapReduce performance by optimizing job execution mechanism in Hadoop clusters", Journal of Parallel and Distributed Computing, 2014, Available online Dec. 1, 2013, pp. 2166-2179, vol. 74, Elsevier.
(Continued)

*Primary Examiner* — Amresh Singh
(74) *Attorney, Agent, or Firm* — Alexa L. Ashworth; Walter L. Rudberg; Brian M. Restauro (57) ABSTRACT

Embodiments of the present invention provide efficient systems and methods for processing large data sets using a composite function. Embodiments of the present invention can be used to compute a broad range of composite functions in a single map-reduce job. Each mapper computes an additive function G on a set of specified data partitions, and then passes the results to one or more reducers. The one or more reducers can then compute a function F, using the aggregate results of function G and data from a single partition.

17 Claims, 5 Drawing Sheets

(56) References Cited

OTHER PUBLICATIONS

Onizuka et al., "Optimization for iterative queries on MapReduce", Proceedings of the VLDB Endowment, vol. 7, No. 4, 40th International Conference on Very Large Data Bases, Sep. 1-5, 2014, pp. 241-252.

Premchaiswadi et al., "Optimizing and Tuning MapReduce Jobs to Improve the Large-Scale Data Analysis Process", International Journal of Intelligent Systems, vol. 28, 2013, pp. 185-200.

Wang et al., "Multi-Query Optimization in MapReduce Framework", Proceedings of the VLDB Endowment, vol. 7, No. 3, 40th International Conference on Very Large Data Bases, Sep. 1-5, 2014, pp. 145-156.

"MapReduce Tutorial", Copyright © 2008 The Apache Software Foundation, pp. 1-42, <https://hadoop.apache.org/docs/r1.2.1/mapred_tutorial.pdf>.

"Optimizing MapReduce Scheduling at the Task-Level", An IP.com Prior Art Database Technical Disclosure, IP.com No. 000217108, May 3, 2012, pp. 1-5.

* cited by examiner

COMPUTATION OF COMPOSITE FUNCTIONS IN A MAP-REDUCE FRAMEWORK

BACKGROUND OF THE INVENTION

The present invention relates generally to the field of data processing systems, and more particularly to computing composite functions in a map-reduce framework.

Parallel processing is used to increase the speed of execution, and amounts of data to be processed. Map-reduce systems provide a framework for parallelizing processing tasks to be performed on large data sets. In a map-reduce framework, mappers process data chunks assigned to them and send their results to reducers, which each receive a portion of all mapper results belonging to a certain subset of a task.

SUMMARY

According to an embodiment of the present invention, a method for processing large data sets using a composite function is provided. The method comprises receiving a query for processing in a map-reduce framework, wherein the query comprises a first function and a second function against data. The method comprises receiving a specification of data partitions, comprising a complete set of keys for the data partitions. The method further comprises computing the first function against the data, for the data partitions, to form partial results, and passing the partial results using the complete set of keys, to one or more reducers. The method further comprises computing a set of first function results and applying the second function to the first set of first function results, to form results for each of the data partitions.

Another embodiment of the present invention provides a computer program product for processing large data sets using a composite function, based on the method described above.

Another embodiment of the present invention provides a computer system for processing large data sets using a composite function, based on the method described above.

DETAILED DESCRIPTION

A map-reduce job often splits the input data set into independent chunks, which are processed by map tasks in a parallel manner. The map-reduce framework then sorts the outputs of the maps, and inputs them into a reduce task. When computing a composite function, e.g., F(X, G(X)), often the aggregates G are computed in a first map-reduce job, and then the aggregates are passed as inputs to a second map-reduce job, which computes the resulting values. However, each map-reduce job on a distributed computing system may incur significant costs for setup and data reading. Embodiments of the present invention provide optimized systems and methods for computation of a broad class of composite functions in a single map-reduce job, in order to improve system performance.

Figure 1:
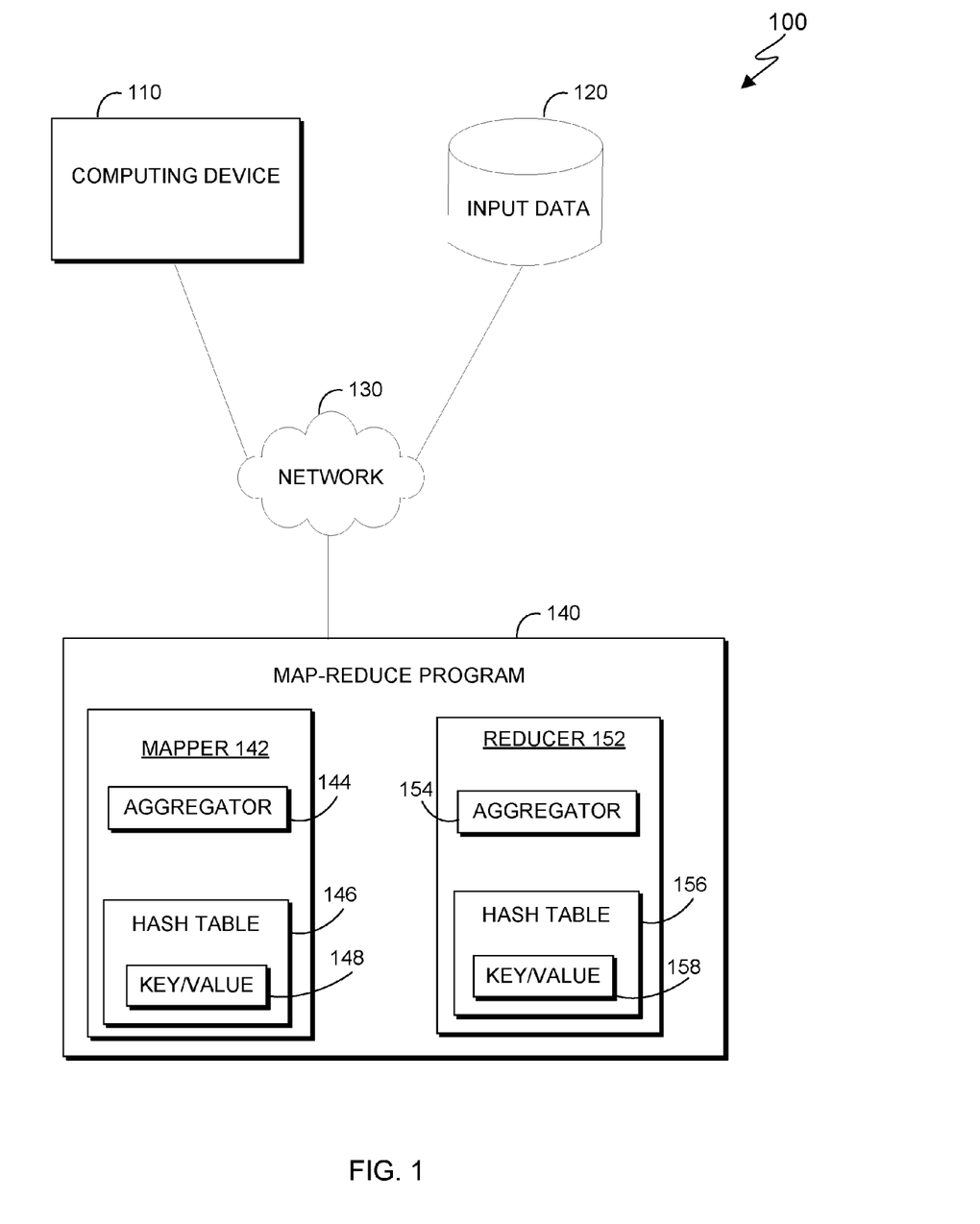
FIG. 1 depicts a block diagram illustrating a map-reduce system, in accordance with an embodiment of the present invention.

The present invention will now be described in detail with reference to the Figures. FIG. 1 depicts a block diagram illustrating a system, generally designated 100, with map-reduce program 140, in accordance with an embodiment of the present invention. Modifications to system 100 may be made by those skilled in the art without departing from the scope of the invention as recited by the claims. In an exemplary embodiment, system 100 includes computing device 110, input data 120, and map-reduce program 140.

In various embodiments of the present invention, computing device 110 can be a laptop computer, a tablet computer, a netbook computer, a personal computer (PC), a desktop computer, a personal digital assistant (PDA), a smart phone, a thin client, a wearable device, or any programmable mobile electronic device capable of executing computer readable program instructions. Computing device 110 may include internal and external hardware components, as depicted and described in further detail with respect to FIG. 5.

In this exemplary embodiment, a user can access map-reduce program 140 on computing device 110, through a network, such as network 130. In other embodiments, network 130 can be, for example, a local area network (LAN), a wide area network (WAN) such as the Internet, or a combination of the two, and can include wired, wireless, or fiber optic connections.

Input data 120 is data in any format, which is suitable for performing map-reduce operations. For example, input data 120 may be in a binary data format, a plain text format, a markup-language format (e.g., XML), or an image format.

Map-reduce program 140 includes mapper 142 and reducer 152. While only one instance of each of mapper 142 and reducer 152 is depicted, it is to be understood that in this exemplary embodiment, map-reduce program 140 is implemented with multiple mappers 142 and reducers 152.

In this exemplary embodiment, mapper 142 is configured to process input data 120 and generate an output, which is passed to reducer 152. Mapper 142 includes aggregator 144, which aggregates the function G for each data partition, and hash table 146, which can be used by mapper 142 to assign key/value pairs 148 to the input data 120.

In this exemplary embodiment, reducer 152 includes aggregator 154 and hash table 156. Aggregator 154 aggregates the received aggregated values of G from each mapper 142, and aggregates the received values into an overall value of G for all data partitions. Reducer 152 processes the output data received from mapper 142. Hash table 156 can store key/value pairs 158. Hash table 156 can be used by each reducer 152 to compute function F for all values with the same key for all key/value pairs 158, and generate an output.

Figure 2:
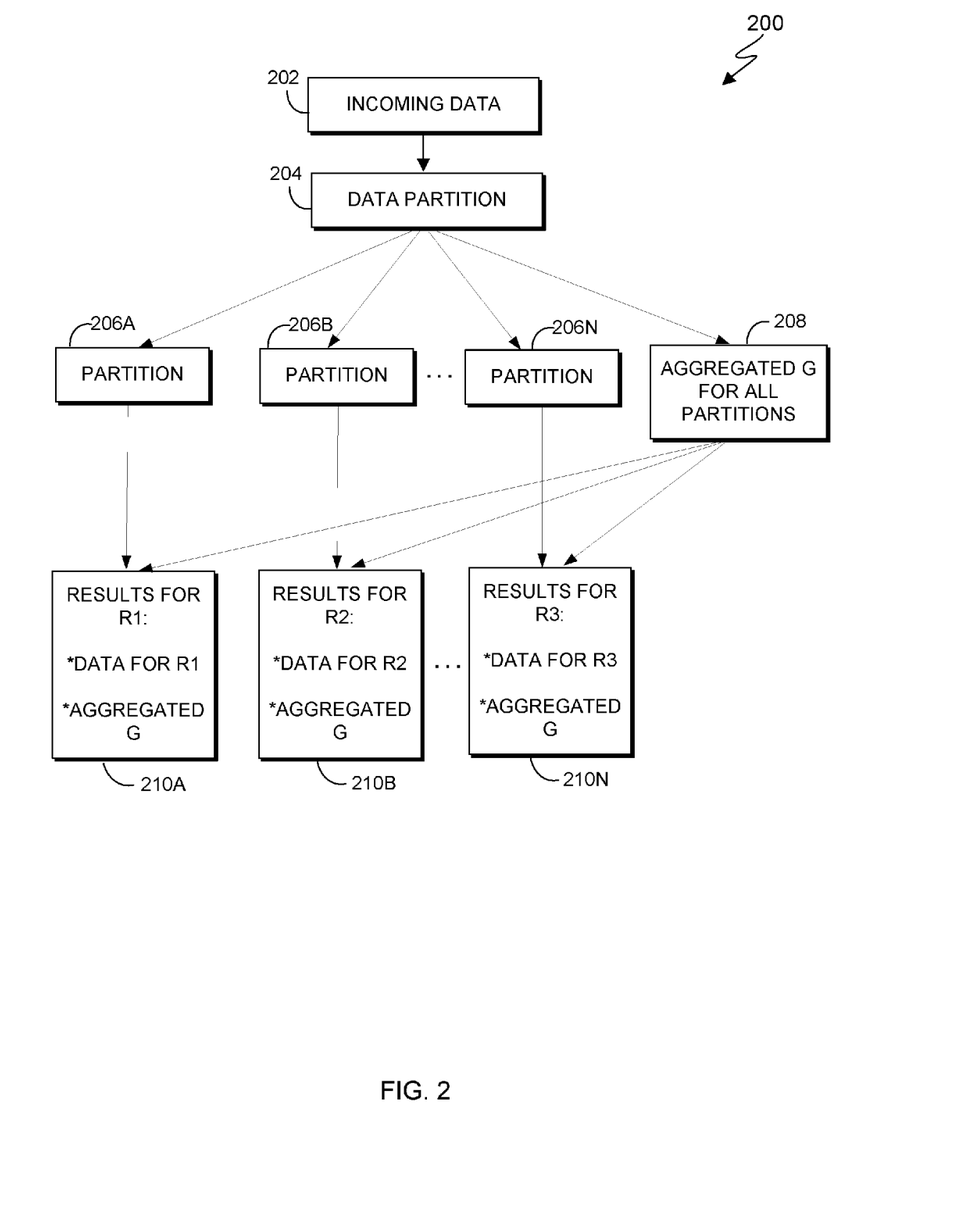
FIG. 2 depicts a block diagram illustrating the flow of data inside each mapper, in accordance with an embodiment of the present invention.

FIG. 2 depicts a block diagram 200 illustrating the flow of data inside each mapper, in accordance with an embodiment of the present invention.

In this exemplary embodiment, incoming data 202 is partitioned, using data partition 204. The number of specified partitions 206A-N is known in advance, so that the set of all possible keys for the mapper output is known before reading the data. Each mapper processes the incoming data 202, and also aggregates the function G 208 for each specified partition 206A-N. Mapper results 210A-N include the aggregated value of G for each specified partition 206A-N, as well as the data from each specified partition 206A-N. Mapper results 210A-N represent the resultant mapper data, which may subsequently be sent to each reducer. In some embodiments, the results of computing the function F on its specified partitions 206A-N are sent to a controller, which collects the results for each specified data partition. The controller may also further aggregate the results into an overall result, if F is an additive function.

Figure 3:
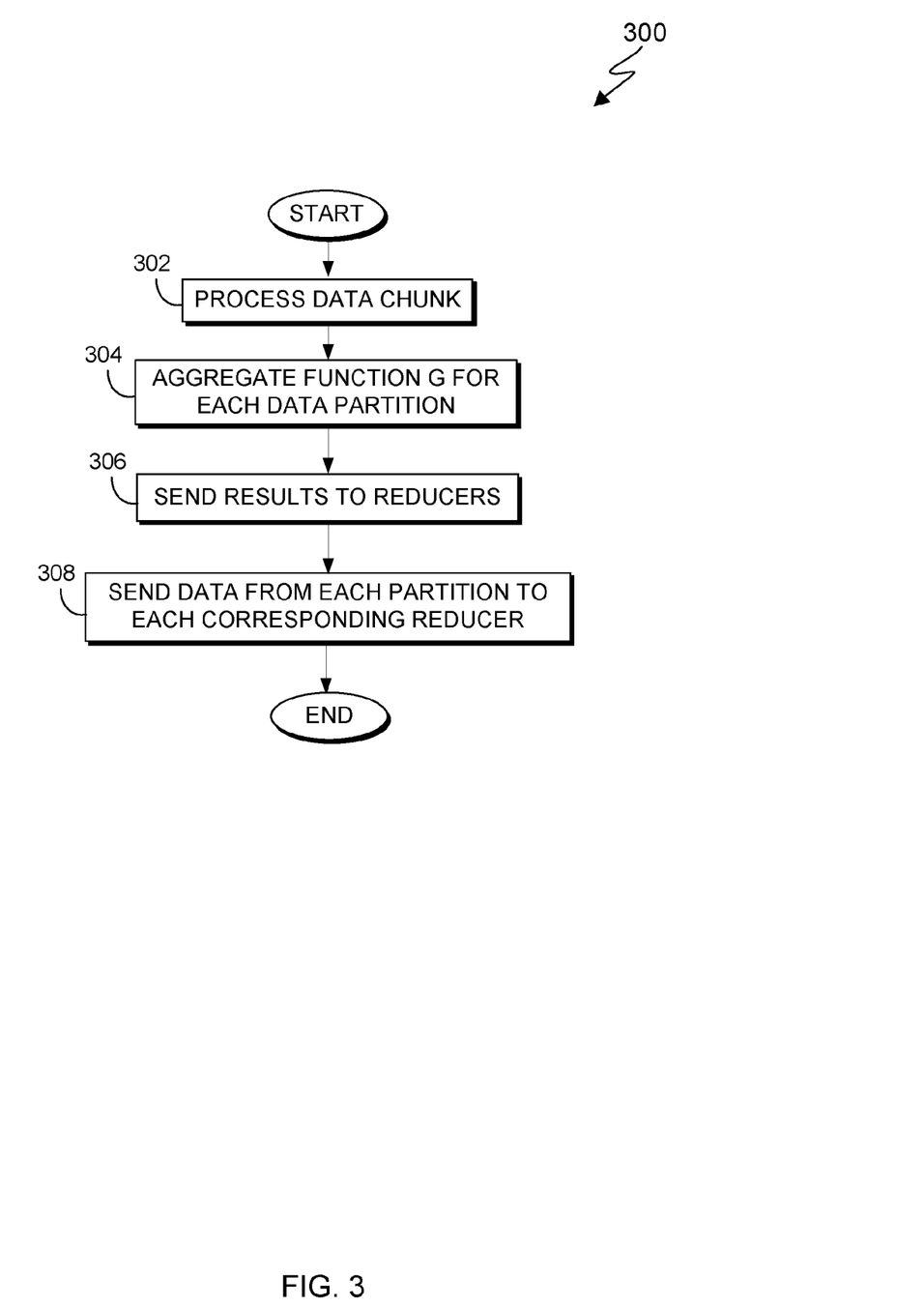
FIG. 3 depicts a flowchart illustrating operational steps for each mapper, in accordance with an embodiment of the present invention.

FIG. 3 depicts a flowchart 300 illustrating operational steps for each mapper 142, in accordance with an embodiment of the present invention.

In step 302, mapper 142 processes a received data chunk. In this exemplary embodiment, mapper 142 processes the entire received data chunk, using a known number of specified data partitions, so that the set of all possible keys for the mapper output is known, before reading in the data chunk. For example, a given data set may be partitioned according to one or more criteria into a disjoint set of partitions.

In step 304, mapper 142 aggregates the function G for each specified data partition. In this exemplary embodiment, mapper 142 computes additive function G on its data, for each specified data partition. For example, if the set of specified data partitions is $X_1, \ldots, X_p$, then the problem is to compute $F_j=F(X_j, G(X_1), \ldots, G(X_p))$, j=1, . . . P, where G is the additive aggregate function, is the where X is a dataset distributed among P partitions, and where J represents a specific partition in which the partition number increases incrementally, by integer, starting at 1 and ending at partition P. Specifically, X represents a set of data on a partition J, where J represents a partition starting at partition 1, partition 2, partition 3, . . . through partition P. The data X may be the same, different and/or different for each specific partition J. Therefore, each reducer, F, addresses a specific subset of data X, plus all aggregates, G, for other data subsets distributed among P partitions. Stated differently, where G(X) is aggregated for the whole data set X (a trivial partition) then the function F(X) is computed for the given data set partition (i.e., $X_j$, where X is a set of data at partition J), by reducing said aggregated values of function $G(X_p)$.

In step 306, mapper 142 sends the results to all reducers. In this exemplary embodiment, mapper 142 sends the results from the computation of additive function G, to all reducers 152, by using all of the possible keys.

In step 308, mapper 142 sends the data from each specified data partition to each corresponding reducer 152.

Figure 4:
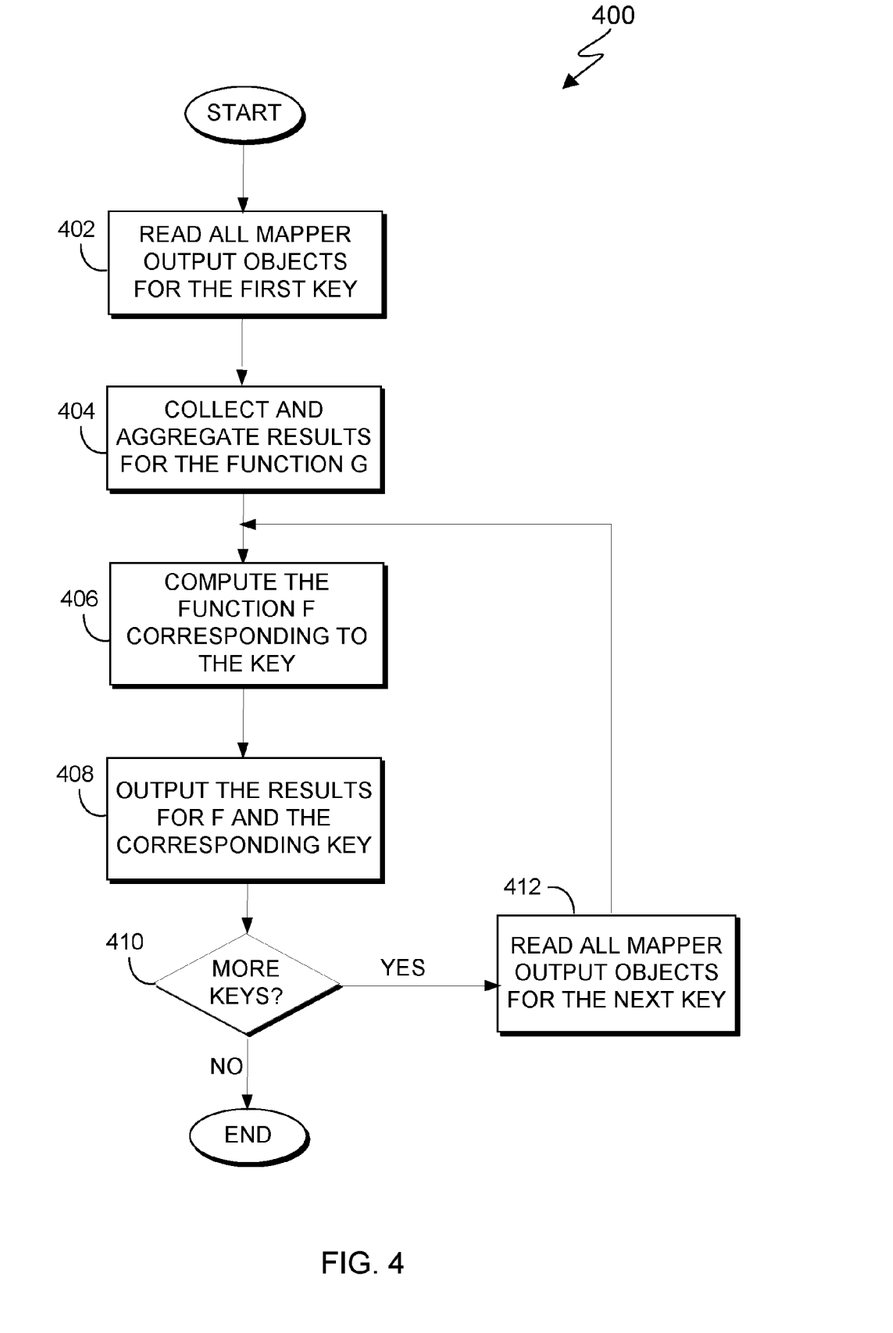
FIG. 4 depicts a flowchart illustrating operational steps for each reducer, in accordance with an embodiment of the present invention.

FIG. 4 depicts a flowchart 400 illustrating operational steps for each reducer 152, in accordance with an embodiment of the present invention.

In step 402, reducer 152 reads all mapper output objects for the first key. In this exemplary embodiment, mapper results with one or more keys may come to a single reducer 152 (i.e., data from step 308 of FIG. 3A).

In step 404, reducer 152 collects and aggregates results for the function G. In this exemplary embodiment, each reducer 152 receives the aggregated values of G from each mapper 142, and aggregates those values into an overall value of G for all of the specified data partitions. By collecting and aggregating the values for function G in each reducer 152, the overall performance of the system is improved.

In step 406, reducer 152 computes the function F, corresponding to the key. In this exemplary embodiment, reducer 152 computes the function F on its specified data partition, passed from each mapper 142.

In step 408, reducer 152 outputs the results for the function F and the corresponding key.

In step 410, reducer 152 determines whether there are more keys. In this exemplary embodiment, mapper 142 results (i.e., outputs) with one or more keys can come to a single reducer 152.

If, in step 410, reducer 152 determines that there are more keys, then, in step 412, reducer 152 reads all mapper output objects for the next key. Reducer 152 continues to compute the function F corresponding to each of the one or more keys from the mapper results, until each key is computed. In this exemplary embodiment, the aggregated function G is computed only once per reducer 152, and is used for each key.

Accordingly, by performing the operations of FIG. 3 and FIG. 4, a wide-range of composite functions can be efficiently computed in a single map-reduce job, by each mapper computing an additive function G on specified data partitions and passing the results to reducer, where a function F, using the aggregate results of function G and data from a single partition, are computed.

The following provide example scenarios, implementing the methods described above. In a first example, the computation of a statistical life table is used. Life tables are widely used in the insurance and pharmaceutical industries, and estimate the survival function, hazard rates, and other statistics for a large set of subjects followed over time. For each subject, the observed survival time ends at a specified time either with an "event" (e.g., death) or being "censored" (e.g., quit the study for some reason). In this example, each input record includes the time and a status variable indicating whether this case ended with an event or was censored. The primary output is a table in which the rows are time intervals and the columns include cumulative probabilities, hazard rates, etc. of the event of interest occurring during the given time interval. Using embodiments of the present invention, the necessary statistics can be computed in a single map-reduce job. Metadata on the time variable is given in advance and it is used to determine the set of time intervals. The time intervals specify the data partition for the methods. Each mapper creates aggregate counts of events and censored cases (i.e., function G) for all time intervals. Each mapper passes this information along with the original data contents for each time interval to the corresponding reducers. Each reducer can process a single, or multiple time intervals. In either case, the system first aggregates the counts for all time intervals (i.e., function G). Then the system uses the original data for the considered time interval together with aggregated data for all intervals to compute the necessary statistics (i.e., function F). The latter statistics require both the original data for a given time interval and the aggregated data for all other time intervals.

In another example, using a data set X which is not partitioned (i.e., there is a single partition X, and F(X, G(X)) is being computed, where both functions F and G are additive), partitions can be introduced, in order to use the computing resources more effectively. For example, the data chunks assigned to each mapper can be used as data set partitions. After G is summarized on each data chunk, it is sent to all of the reducers, and the whole data chunk from each mapper is sent to a single corresponding reducer. The function F is aggregated into the overall result in the controller. An example of the computation of the mean absolute deviation can be derived. Function G is the field mean, while function F is the mean of the absolute differences from the mean. Each mapper aggregates the mean on each data chunk and sends it to all of the reducers, while each reducer computes the overall mean, as well as, the mean of absolute deviations from the overall mean on its data portion. The controller summarizes the overall mean of absolute deviations.

In another example, the data set X is partitioned, however, the function G needs to be aggregated on the whole data set X, when computing $F(X_j, G(X))$, $j=1, \ldots, P$. The difference from the general case is that function G is aggregated in mappers and reducers for the entire data set, rather than for each partition separately. An example is finding words which appear above a given total percentage threshold. For example, function G is the total number of words including their frequencies, while function F is an indicator of whether frequency of a single word is greater than the total percentage threshold. Using the first letter (or two) of each word as the key for reducers, this task can be completed in one map-reduce job. Mappers count words in each data partition, and send the total count to each key and all the words starting with the same letter (along with their individual counts) to the corresponding reducers. Each reducer computes the total counts, as well as, the count and frequency indicators for a given set of words in $X_j$, $j=1, \ldots, P$.

In yet another example, data set X is partitioned in two sets of different partitions. The function G needs to be aggregated according to the first set of partitions, and the function F is computed for the second set of partitions. The output keys for the mappers are constructed according to the second set of partitions. The difference from the general case is that function G is aggregated in mappers and reducers according to the first set of partitions before computing function F for the second set of partitions. The previous example is a special case of the present example, where G is aggregated for the whole data set X (a trivial partition) and the function F is computed for the given data set partition.

Figure 5:
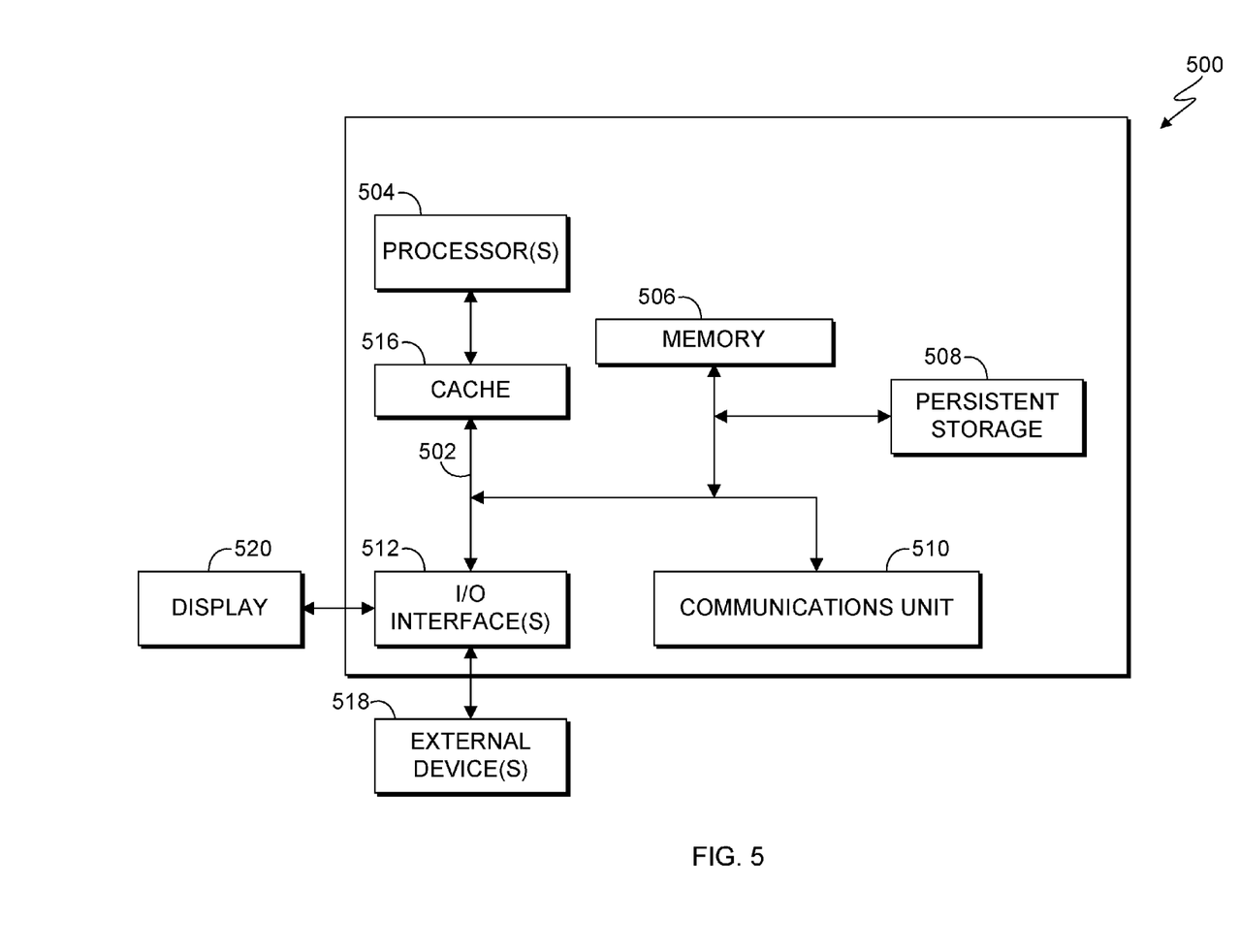
FIG. 5 depicts a block diagram of components of a computing device, in accordance with an illustrative embodiment of the present invention.

FIG. 5 is a block diagram of internal and external components of a computing device, generally designated 500, which is representative of the computing device of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, cache 516, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of a network. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for processing large data sets using a composite function, the method comprising:
  receiving, by one or more processors, a query for processing in a map-reduce framework, wherein the query comprises a first function (G) and a second function (F) against data;
  receiving, by one or more processors, a specification of data partitions, comprising a complete set of keys for the data partitions;
  computing, by one or more mappers, the first function (G) against the data, for the data partitions, to form partial results, wherein the partial results comprise aggregate values of the first function (G) for each data partition of the data partitions;

passing, by the one or more mappers, the partial results using the complete set of keys, to one or more reducers, wherein each of the one or more reducers receives the aggregate values of the first function (G) from the one or more mappers;

aggregating, by the one or more reducers, the received aggregate values of the first function (G) into an overall value of the first function (G) for the data partitions;

computing, by the one or more reducers, a set of first function (G) results for each data partition of the data partitions;

applying, by the one or more reducers, the second function (F) to the set of first function (G) results, to form results for each of the data partitions; and receiving, by one or more processors, results from each of the data partitions a result of the query wherein the result of the query is computed from $F_j=F(X_j, G(X_1), \ldots, G(X_p))$, $j=1, \ldots, P$, using an additive function against the results from each of the data partitions, wherein G(X) is aggregated for each data set X located on each of the data partitions $X_1, \ldots, X_p$, and function and $F(X_j)$ is a reducing function computed for a given data set partition $X_j$.

2. The method of claim 1, further comprising:
receiving, by one or more processors, results from each of the data partitions, comprising a result of the query.

3. The method of claim 2, wherein the result of the query is computed using a statistical function against the results from each of the data partitions.

4. The method of claim 1, wherein computing, by one or more mappers, the first function (G) against the data, for the data partitions, to form partial results, further comprises:
processing, by one or more processors, the data, wherein the data is incoming data; and
aggregating, by one or more processors, the first function (G) against the data for each of the data partitions.

5. The method of claim 1, wherein the map-reduce framework comprises: a parallel distributed multi-node processing system.

6. The method of claim 1, wherein a single map-reduce iteration is performed on the first function (G) and the second function (F).

7. A computer program product for processing large data sets using a composite function, the computer program product comprising:
a computer readable storage medium and program instructions stored on the computer readable storage medium, the program instructions comprising:
program instructions to receive a query for processing in a map-reduce framework, wherein the query comprises a first function (G) and a second function (F) against data;
program instructions to receive a specification of data partitions, comprising a complete set of keys for the data partitions;
program instructions to compute the first function (G) against the data, for the data partitions, to form partial results, wherein the partial results comprise aggregate values of the first function (G) for each data partition of the data partitions;
program instructions to pass the partial results using the complete set of keys, to one or more reducers, wherein each of the one or more reducers receives the aggregate values of the first function (G) from the one or more mappers;
program instructions aggregate the received aggregate values of the first function (G) into an overall value of the first function (G) for the data partitions;
program instructions to compute a set of first function (G) results for each data partition of the data partitions;
program instructions to apply the second function (F) to the set of first function (G) results, to form results for each of the data partitions; and
program instructions to receive results from each of the data partitions a result of the query wherein the result of the query is computed from $F_j=F(X_j, G(X_1), \ldots, G(X_p))$, $j=1, \ldots, P$, using an additive function against the results from each of the data partitions, wherein G(X) is aggregated for each data set X located on each of the data partitions $X_1, \ldots, X_p$, and function and $F(X_j)$ is a reducing function computed for a given data set partition $X_j$.

8. The computer program product of claim 7, further comprising:
program instructions to receive results from each of the data partitions, comprising a result of the query.

9. The computer program product of claim 8, wherein the result of the query is computed using a statistical function against the results from each of the data partitions.

10. The computer program product of claim 7, wherein the program instructions to compute the first function (G) against the data, for the data partitions, to form partial results, further comprise:
program instructions to process the data, wherein the data is incoming data; and
program instructions to aggregate the first function (G) against the data for each of the data partitions.

11. The computer program product of claim 7, wherein a single map-reduce iteration is performed on the first function (G) and the second function (F).

12. A computer system for processing large data sets using a composite function, the computer system comprising:
one or more computer processors;
one or more computer readable storage media; and
program instructions stored on the one or more computer readable storage media for execution by at least one of the one or more processors, the program instructions comprising:
program instructions to receive a query for processing in a map-reduce framework, wherein the query comprises a first function (G) and a second function (F) against data;
program instructions to receive a specification of data partitions, comprising a complete set of keys for the data partitions;
program instructions to compute the first function (G) against the data, for the data partitions, to form partial results, wherein the partial results comprise aggregate values of the first function (G) for each data partition of the data partitions;
program instructions to pass the partial results using the complete set of keys, to one or more reducers, wherein each of the one or more reducers receives the aggregate values of the first function (G) from the one or more mappers;
program instructions aggregate the received aggregate values of the first function (G) into an overall value of the first function (G) for the data partitions;
program instructions to compute a set of first function (G) results for each data partition of the data partitions;

program instructions to apply the second function (F) to the set of first function (G) results, to form results for each of the data partitions; and program instructions to receive results from each of the data partitions a result of the query wherein the result of the query is computed from $F_j=F(X_j, G(X_1), \ldots, G(X_p))$, $j=1, \ldots, P$, using an additive function against the results from each of the data partitions, wherein G(X) is aggregated for each data set X located on each of the data partitions $X_1, \ldots, X_p$, and function and $F(X_j)$ is a reducing function computed for a given data set partition $X_j$.

13. The computer system of claim 12, further comprising: program instructions to receive results from each of the data partitions, comprising a result of the query.

14. The computer system of claim 13, wherein the result of the query is computed using a statistical function against the results from each of the data partitions.

15. The computer system of claim 12, wherein the program instructions to compute the first function (G) against the data, for the data partitions, to form partial results, further comprise:

program instructions to process the data, wherein the data is incoming data; and program instructions to aggregate the first function (G) against the data for each of the data partitions.

16. The computer system of claim 12, wherein the map-reduce framework comprises: a parallel distributed multi-node processing system.

17. The computer system of claim 12, wherein a single map-reduce iteration is performed on the first function (G) and the second function (F).

\* \* \* \* \*